United States Patent
Chow et al.

[11] Patent Number: 6,052,387
[45] Date of Patent: Apr. 18, 2000

[54] ENHANCED INTERFACE FOR AN ASYNCHRONOUS TRANSFER MODE SEGMENTATION CONTROLLER

[75] Inventors: Kit Man Chow, Carlsbad; Chinh Kim Nguyen, San Diego, both of Calif.

[73] Assignee: NCR Corporation, Dayton, Ohio

[21] Appl. No.: 08/961,873

[22] Filed: Oct. 31, 1997

[51] Int. Cl.[7] ...................................................... H04L 12/00
[52] U.S. Cl. .............................. 370/474; 370/471; 710/22
[58] Field of Search ........................................ 370/473, 474, 370/395, 471, 463; 711/111, 112, 105; 709/250, 249, 212; 710/22

[56] References Cited

U.S. PATENT DOCUMENTS

| | | |
|---|---|---|
| 5,602,853 | 2/1997 | Ben-Michael et al. ................. 370/474 |
| 5,606,665 | 2/1997 | Yang et al. . |
| 5,610,921 | 3/1997 | Christensen . |
| 5,633,870 | 5/1997 | Gaytan et al. . |
| 5,689,509 | 11/1997 | Gaytan et al. . |
| 5,875,292 | 2/1999 | Taketsugu . |

*Primary Examiner*—Douglas W. Olms
*Assistant Examiner*—Kenneth Vanderpuye
*Attorney, Agent, or Firm*—Gates & Cooper

[57] ABSTRACT

An enhanced interface between a processor and an Asynchronous Transfer Mode (ATM) segmentation controller. A software driver communicates with the controller to efficiently segment protocol data units (PDUs) into ATM cells for transmission. The software driver creates a series of data structures in memory for managing the PDU, wherein the data structures include a linked list of buffer descriptors that describe the size and location of subportions of the PDU. The ATM controller is capable of accessing and interpreting these data structures. As a result, only a single I/O operation is required for the software driver to initiate direct memory access (DMA) operations by the ATM controller to retrieve the data structures from memory and subsequently transmit the PDU.

39 Claims, 9 Drawing Sheets

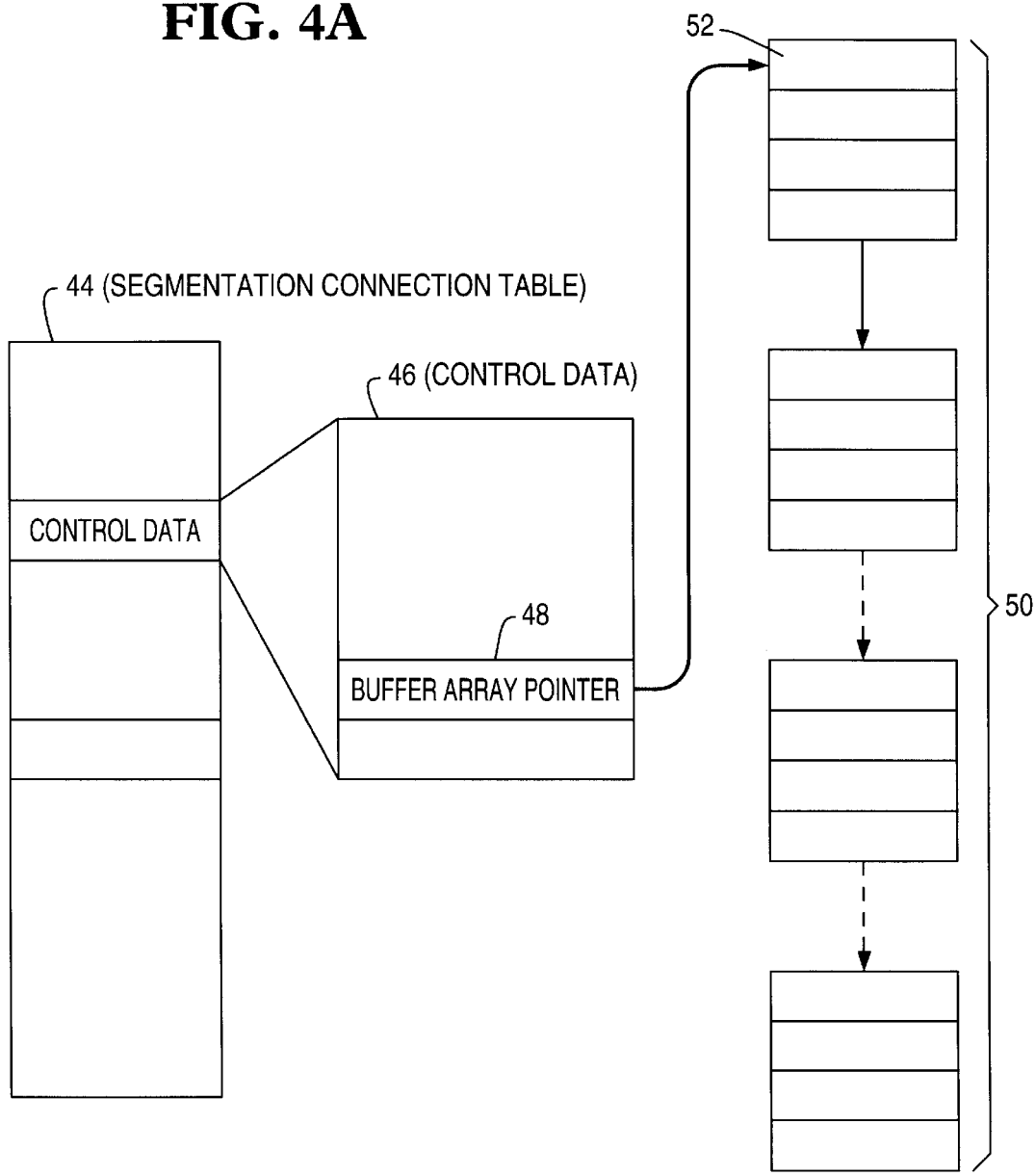

ENHANCED INTERFACE FOR AN ASYNCHRONOUS TRANSFER MODE SEGMENTATION CONTROLLER

BACKGROUND OF THE INVENTION

1. Field of the Invention

This invention relates in general to a controller or adapter for interfacing to an Asynchronous Transfer Mode (ATM) network, and more particularly, to an efficient mechanism for providing an enhanced interface for an ATM segmentation controller.

2. Description of Related Art

ATM is a digital switching protocol that has become a widely adopted standard in the past few years. Data transmission under the ATM protocol is cell-based via virtual circuits or connections, wherein the virtual connection is identified by data values contained within the cell. Data is transmitted between a source and destination by establishing virtual connections between a pair of ATM end-systems which are needed to connect a source with a destination. These connections are termed "virtual" to distinguish them from dedicated circuits. ATM cells always traverse the same path from source to destination. However, the ATM protocol does not have to reserve the path for one user exclusively. Any time a given virtual connection is not occupying a physical link, another virtual connection is free to use it.

SUMMARY OF THE INVENTION

To overcome the limitations in the prior art described above, and to overcome other limitations that will become apparent upon reading and understanding the present specification, the present invention discloses a method, apparatus, and article of manufacture providing an enhanced interface between a processor and an Asynchronous Transfer Mode (ATM) segmentation controller. The software driver communicates with the controller to efficiently segment protocol data units (PDUs) into ATM cells for transmission. The software driver creates a series of data structures in memory for managing the PDU, wherein the data structures include a linked list of buffer descriptors that describe the size and location of subportions of the PDU. The ATM controller is capable of accessing and interpreting these data structures. As a result, only a single I/O operation is required for the software driver to initiate direct memory access (DMA) operations by the ATM controller to retrieve the data structures from memory and subsequently transmit the PDU.

One object of the present invention is to provide an enhanced interface to an ATM segmentation controller. Another object of the present invention is to eliminate some of the overhead in transmitting ATM cells.

BRIEF DESCRIPTION OF THE DRAWINGS

Referring now to the drawings in which like reference numbers represent corresponding parts throughout:

FIGS. 4A and 4B are block diagrams that illustrate the data structures provided by the present invention.

DETAILED DESCRIPTION OF THE INVENTION

In the following description of the exemplary embodiments, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

Figure 1:
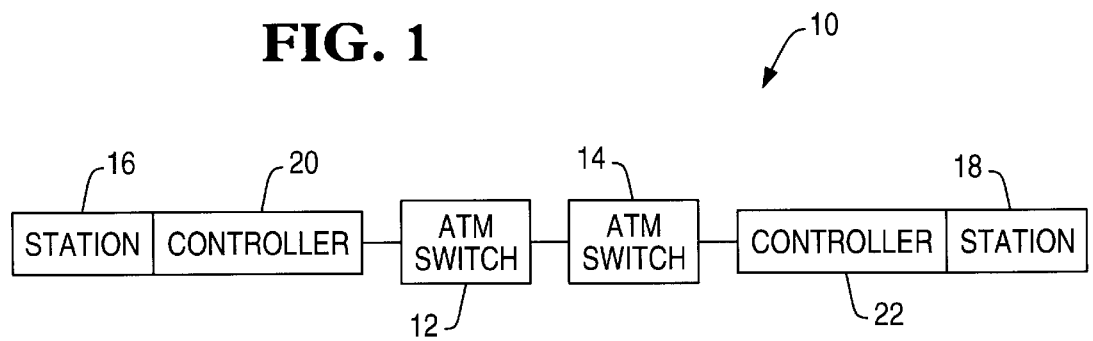
FIG. 1 illustrates an exemplary Asynchronous Transfer Mode (ATM) network including two ATM switches, two stations coupled respectively thereto, and two ATM segmentation controllers coupled between the stations and the switches.

FIG. 1 illustrates an exemplary Asynchronous Transfer Mode (ATM) network 10 including two ATM switches 12, 14 and two stations 16, 18 coupled respectively thereto. An ATM controller 20, 22 resides in each of the stations 16, 18, respectively. By way of example, if station 16 is transmitting data to station 18, the ATM controller 20 in station 16 is involved in segmenting the data into cells, setting the appropriate fields in the cells, and then transmitting the cells via ATM switches 12, 14. The ATM controller 22 coupled to station 18 is involved in reassembling the cells received into a complete unit of data and delivering the data to station 18.

The invention is generally implemented in logic or instructions performed by the stations 16, 18 and their respective controllers 20, 22. Generally, the logic or instructions may form an integral part of the stations 16, 18 or the controllers 20, 22, or may be tangibly embodied in and/or readable from a device, carrier, or media, such as a memory, data storage devices, and/or a remote device coupled to the stations 16, 18 and/or the controllers 20, 22.

Thus, the present invention may be implemented as a method, apparatus, or article of manufacture using standard programming and/or engineering techniques to produce software, firmware, hardware, or any combination thereof. The term "article of manufacture" (or alternatively, "logic carrier") as used herein is intended to encompass any device, carrier, or media that provides access to logic, instructions and/or data useful in performing the same or similar functionality. Of course, those skilled in the art will recognize many modifications may be made to this configuration without departing from the scope of the present invention.

ATM Cell Structure

Figure 2:
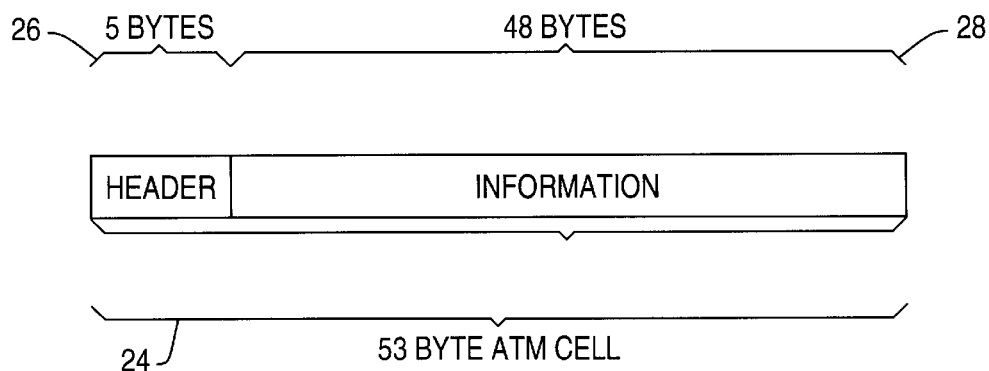
FIG. 2 is a block diagram that illustrates the structure of an ATM cell.

FIG. 2 is a block diagram that illustrates the structure of an ATM cell 24. ATM cells 24 are 53 bytes long. They consist of a 5-byte header field 26 (containing an identifier of data flow which implicitly identifies the source address and the destination address) and a 48-byte information field 28. The header 26 of an ATM cell 24 contains all the information the ATM network 10 needs to relay the cell 24 from one station 16, 18 to another station 16, 18 over a pre-established route. User data is contained in the information field 28.

ATM Segmentation Controller

Figure 3:
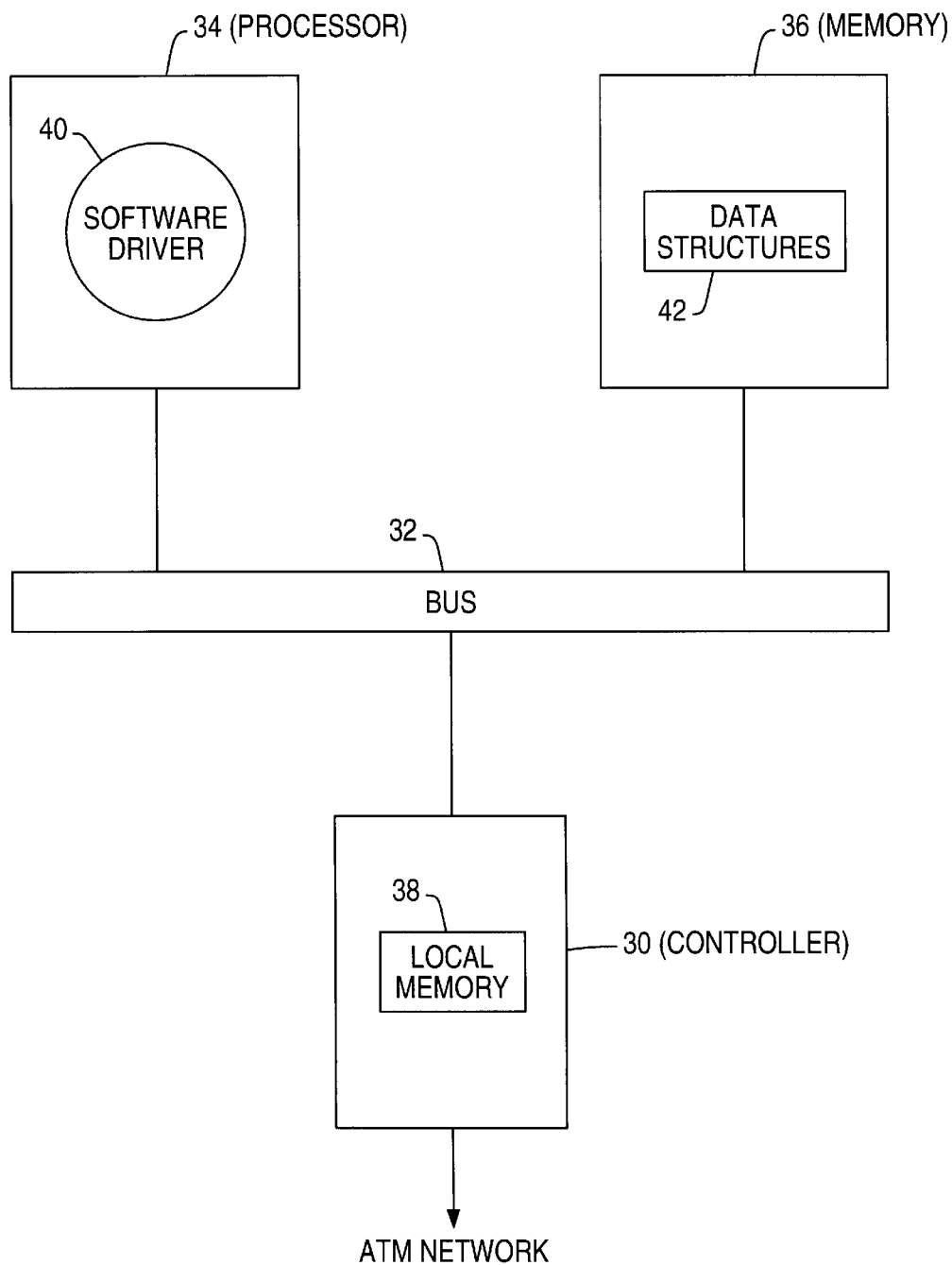
FIG. 3 is a block diagram that illustrates the structure and operation of an exemplary ATM segmentation controller, wherein the controller is coupled via a bus to a processor and a memory.

FIG. 3 is a block diagram that illustrates the structure and operation of an exemplary ATM segmentation controller 30, wherein the controller 30 is coupled via a bus 32 to a processor 34 and a memory 36. In this example, the bus, processor 34, and memory 36 comprise elements of one of the stations 16, 18.

The exemplary ATM controller 30 operates in the following manner when receiving ATM cells for a specific virtual connection. Incoming ATM cells are received and assembled into a unit of data in the local memory 38 of the controller 30. Once the assembly is complete, the controller 30 notifies the processor 34, which decides where the data will be stored in the memory 36. The controller 30 then sends the data to the memory 36 via the bus 32.

The exemplary ATM controller 30 operates in the following manner when transmitting data for a specific virtual connection. The processor 34 decides which data will be accessed and instructs the controller 30 to retrieve the data from the memory 36 via a direct memory access (DMA) operation across the bus 32. The DMA operation retrieves the data from the memory 36 via the bus 32 and stores them in the local memory of the controller 30. The controller 30 segments the data into 53-byte ATM cells and then transmits the cells across the ATM network.

The controller 30 also performs these various operations and paces the transmissions and receptions for a set of different virtual circuits, if required.

Software Driver

Preferably, the processor 34 executes a software driver 40 that communicates with the controller 30 to efficiently segment protocol data units (PDUs) into ATM cells for transmission. As the ATM PDU is delivered to the control of the software driver 40 from a higher layer, such as an application program, the data comprising the PDU are scattered in different buffers at different locations in the memory 36. It is very costly for the software driver 40 to gather these buffers into a large buffer prior to transfer to the controller 30 for transmission (e.g., by reading and writing 4 bytes of data at a time from and to the memory 36 across a 32-bit bus 32). The present invention allows the controller 30 to gather the data and therefore avoid the some of the overhead of the software driver 40 copying the PDU data among different locations in the memory 36.

The software driver 40 needs to add new PDUs for the controller 30 to transmit while the controller 30 is transmitting a previous PDU. An unacceptable latency is incurred if the software driver 40 must wait for feedback signals from the controller 30 following the transmission of every PDU and before submitting the next PDU for transmission. The present invention provides data structures 42 that allow the software driver 40 to schedule and process an unlimited numbers of PDUs without having to inform the controller 30 of every additional PDU.

Excessive interrupt and status on every PDU can be very expensive to system performance. The invention provides the software driver 40 with the flexibility to be selective in which PDU requires status or interrupt, therefore reducing the total number of interrupt and status signals transmitted from the controller 30 to the host processor 34.

The present invention also limits to the number of accesses to the controller 30 to initiate the transmission to only one access.

PDU Data Structures

Figure 4B:
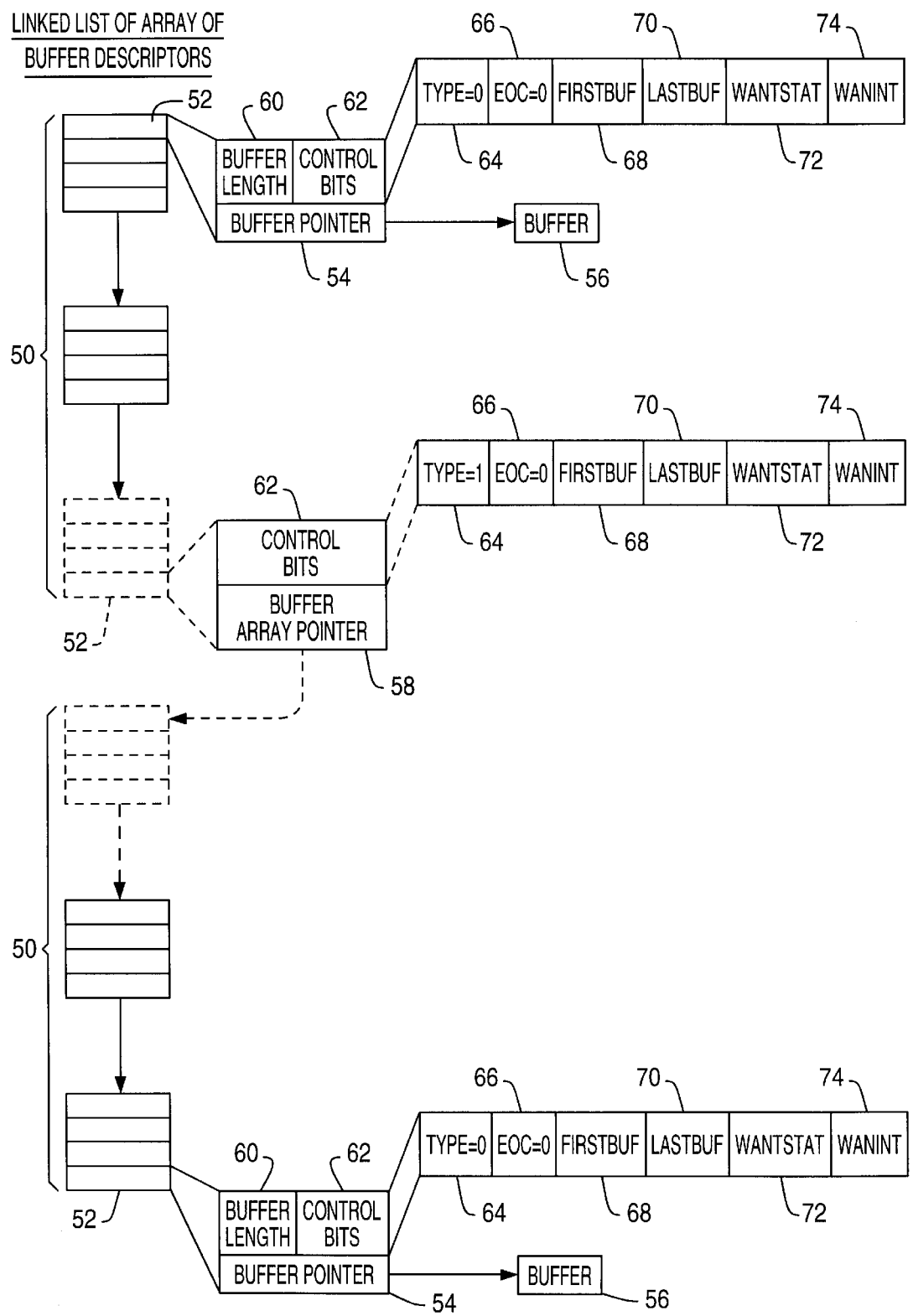

FIGS. 4A and 4B are block diagrams that illustrate the components of the data structures 42 provided by the present invention. These data structures 42 define the interface between the software driver 40 and the controller 30.

Referring to FIG. 4A, a segmentation connection table 44 stored in the memory 36 contains a pointer to one or more control data structures 46, each of which specifies the characteristics of the transmission of data on a virtual connection. The control data structure 46 contains information such as transmission interval, service type, pointer 48 to PDU data, etc.

The pointer 48 is a pointer to a second data structure comprising a linked list 50 of buffer descriptors 52. Each buffer descriptor 52 describes the characteristics of a buffer of data for a PDU. The PDU data may be comprised of a number of smaller buffers of data of varying sizes and located at different locations in the memory 36. The buffer descriptor 52 functions to describe each buffer in the PDU using information such as the length of the buffer and a pointer to the location of the buffer in the memory 36.

Referring to FIG. 4B, the software driver 40 delivers each PDU to the controller 30 as a linked list 50 comprising an array of buffer descriptors 52. The software driver 40 can append another PDU to the linked list 50 as required, by linking two such linked lists 50. In addition, if the buffer descriptors 52 fill an entire linked list 50, the software driver 40 can add more buffer descriptors 52 by expanding the linked list 50 or by linking a new linked list 50 to the previous linked list 50.

Each buffer descriptor 52 contains a number of fields, including the following:

A pointer 54 to the physical location in memory 36 where the buffer 56 is located, or alternatively, a pointer 58 to the next linked list 50.

A buffer length field 60 that specifies the length of the buffer 56.

A control field 62 that describes the characteristics of the buffer descriptor 52 and contains the following bits:

A Type bit 64 that indicates the type of buffer descriptor 52, i.e., whether the buffer descriptor 52 includes a buffer pointer 54 or a buffer array pointer 58.

An End of Chain (EOC) bit 66 that indicates whether the buffer descriptor 52 is the last one in the linked list 50 and thus there are no more PDUs to transmit.

A First Buffer (FirstBuf) bit 68 that indicates that the buffer descriptor 52 is the first one of the linked list 50 and thus is a PDU.

A Last Buffer (LastBuf) bit 70 that indicates that the buffer descriptor 52 is the last one of a linked list 50 and thus of a PDU.

A Want Status (WantStat) bit 72 that indicates that the buffer descriptor 52 requires a status signal from the controller 30 to the processor 34 at the completion of the transmission of the PDU.

A Want Interrupt (WanInt) bit 74 that indicates that the buffer descriptor 52 requires an interrupt signal from the controller 30 to the processor 34 at the completion of the transmission of the PDU.

Operations

After the first linked list 50 of buffer descriptors 52 is established by the software driver 40, the software driver 40 writes the first pointer to the buffer descriptor 52 to the control data structure 46. Thereafter, the software driver 40 issues an I/O operation from the processor 34 to the controller 30 that includes the segmentation connection table 44 and the control data structure 46. Each buffer descriptor 46 is retrieved, in turn, in order to create the ATM cells, which the controller 30 then transmits across the ATM network 10.

In the present invention, the buffer descriptor 52 allows the data of the PDU to be located in any number of buffers stored anywhere in the memory 36. The controller 30 can locate the data of the PDU, retrieve the data, segment the data into ATM cells, and then transmit the ATM cells. This helps avoid the costs of copying by the processor 34 from multiple buffers into one large data buffer. Moreover, the controller 30 can access the PDU data in bursts using DMA operations, which are much more efficient.

The End Of Chain bit 66 allows for efficient communication between the software driver 40 and the controller 30. The software driver 40 can add as many PDUs as desired by linking the linked lists 50 using the buffer array pointer 58 without having to inform the controller 30. The controller 30 can continue transmitting PDUs in the linked lists 50 until it encounters a set EOC bit 66.

The software driver 40 adds PDUs to the linked lists 50 by linking the linked list 50 having the buffer descriptors 52 of the new PDU to the linked list 50 of the previous PDU. The EOC bit 62 in the last buffer descriptor 52 of the new PDU is set to one and the EOC bit 62 in the last buffer descriptor 52 of the previous PDU is cleared.

The controller 30 may or may not see the above addition of a new PDU due to a "race" condition between the controller 30 fetching buffer descriptors 52 and the software driver 40 creating and linking the buffer descriptors 52. Thus, the controller 30 always sends a status signal to inform the processor 34 of the EOC condition. Upon receiving this EOC status signal, the software driver 40 can determine if the appended linked list 50 has been transmitted. If not, the software driver 40 reactivates the controller 30 to restart the transmission.

The Want Status bit 72 and Want Interrupt bit 74 allow the software driver 40 to specify whether a status signal or an interrupt signal should be sent from the controller 30 the processor 34 after transmission of a PDU by the controller 30. These bits provide the software driver 40 with the flexibility of requesting status and interrupt signals from the controller 30 at any time and not necessarily on a PDU boundary. Moreover, the software driver 40 may request a status or interrupt signal after a number of PDUs transmitted, thereby reducing significantly the frequency of such signals.

Logic

FIGS. 5A, 5B, 5C, 5D, and 5E are flowcharts that illustrate the logic performed by various components of the present invention.

Figure 5A:
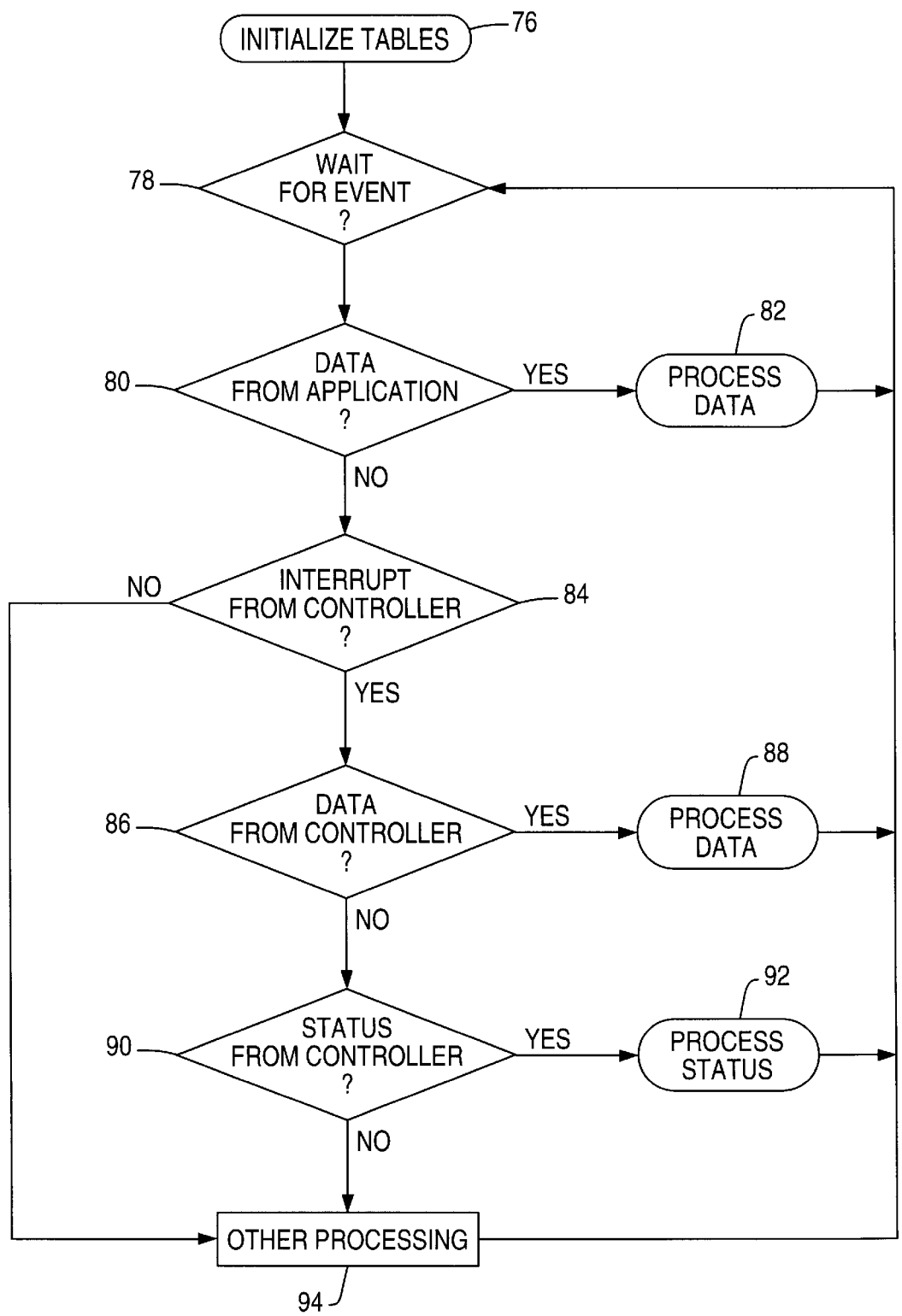
FIGS. 5A, 5B, 5C, 5D, and 5E are flowcharts that illustrate the logic performed by various components of the present invention.

FIG. 5A is a flowchart that illustrates the logic performed by the software driver 40 according to the present invention.

Block 76 represents the software driver 40 initializing the data structures 42 used in the present invention, including both the segmentation connection table 44 and the control data structure 46. Block 78 represents the software driver 40 waiting for the next event to occur; thereafter, blocks 80–94 are performed.

Figure 5B:
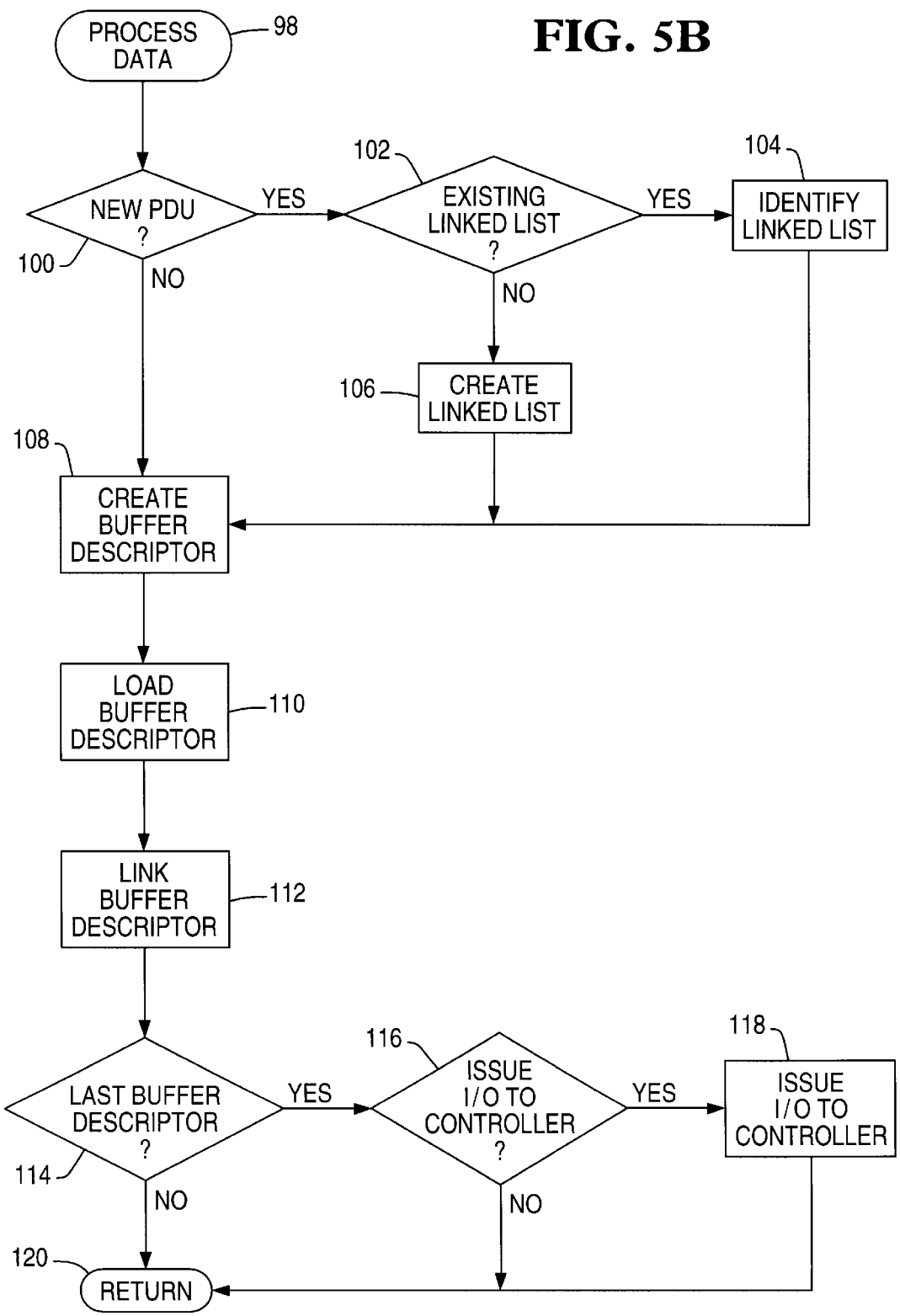

Block 80 is a decision block that represents the software driver determining whether the event was the receipt of a PDU from a higher-level application. If so, control transfers to Block 82, which represents the software driver 40 processing the data. FIG. 5B further illustrates the logic performed in Block 82.

Block 84 is a decision block that represents the software driver 40 determining whether the event was the receipt of an interrupt signal from the ATM segmentation controller 30. If so, control transfers to Block 86; otherwise, control transfers to Block 94.

Block 86 is a decision block that represents the software driver 40 determining whether the event was the receipt of a PDU from the ATM segmentation controller 30. If so, control transfers to Block 88, which represents the software driver 40 processing the data.

Block 90 is a decision block that represents the software driver 40 determining whether the event was the receipt of a status signal from the ATM segmentation controller 30. If so, control transfers to Block 92, which represents the software driver 40 processing the status signal.

Finally, Block 94 represents the software driver 40 performing other processing.

FIG. 5B is a flowchart that illustrates the logic performed by the software driver 40 in processing PDU data in preparation for transferring such data to the ATM segmentation controller 30 according to the present invention.

Block 98 is the beginning of the logic. Block 100 is a decision block that represents the software driver 40 determining whether the data received is a new PDU. If so, control transfers to Block 102; otherwise, control transfers to Block 108.

Block 102 is a decision block that represents the software driver 40 determining whether the buffer array pointer 46 in the control data structure 46 that identifies an existing linked list 50 of buffer descriptors 52. If so, control transfers to Block 104, which represents the software driver 40 identifying the existing linked list 50 and modifying it to receive a new PDU; otherwise, control transfers to Block 106, which represents the software driver 40 creating a new linked list 50 and logically associating it with the buffer array pointer 48 in the control data structure 46. In both instances, control thereafter transfers to Block 108.

Block 108 represents the software driver 40 creating a buffer descriptor 52 for the PDU data, Block 110 represents the software driver 40 setting the various fields of the buffer descriptor 52, and Block 112 represents the software driver 40 linking the buffer descriptor 52 into the linked list 50.

Block 114 is a decision block that represents the software driver 40 determining whether the buffer descriptor 52 is the last such structure of the PDU. If so, control transfers to Block 116; otherwise, control transfers to Block 120.

Block 116 is a decision block that represents the software driver 40 determining whether to issue an I/O to the ATM segmentation controller 30. If so, control transfers to Block 118, which issues the I/O; otherwise, control transfers to Block 120.

Finally, Block 120 represents the return of the logic to FIG. 5A.

Figure 5C:
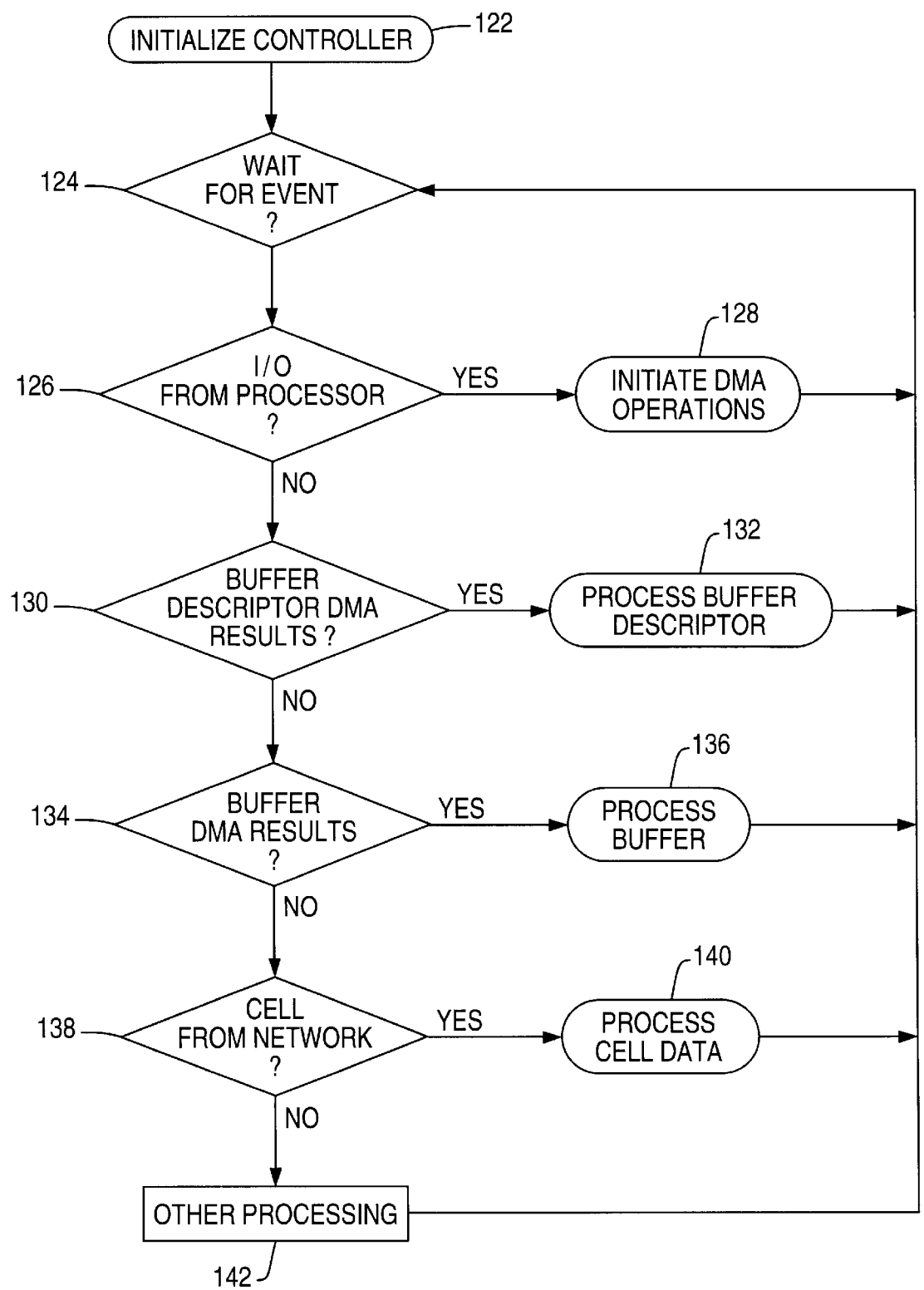

FIG. 5C is a flowchart that illustrates the logic performed by the ATM segmentation controller 30 according to the present invention.

Block 122 represents the controller 30 initializing itself. Block 124 represents the controller 30 waiting for the next event to occur; thereafter, blocks 126–142 are performed.

Block 126 is a decision block that represents the ATM segmentation controller 30 determining whether the event was the receipt of an I/O operation issued by the processor 34. If so, control transfers to Block 128, which represents the controller 30 processing the I/O by initiating a DMA operation to retrieve a first buffer descriptor 52 in the linked list 50 from the memory 36, wherein the first buffer descriptor 52 in the linked list 50 is identified by the buffer array pointer 48 in the control data structure 46 passed to the controller 30 by the processor 34 in the I/O operation.

Figure 5D:
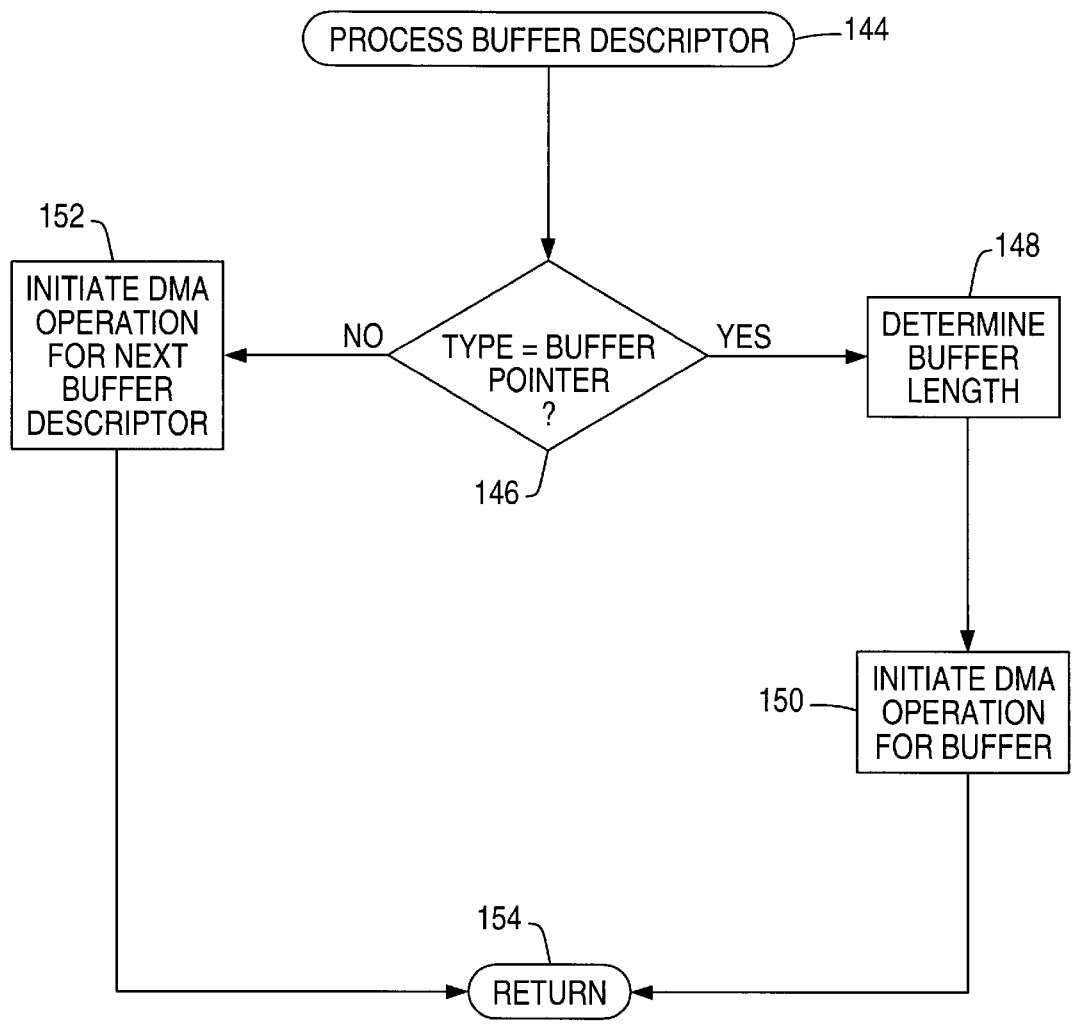

Block 130 is a decision block that represents the controller 30 determining whether the event was the receipt of the buffer descriptor 52 retrieved by a DMA operation. If so, control transfers to Block 132, which represents the controller 30 processing the buffer descriptor 52. FIG. 5D further illustrates the logic performed in Block 132.

Figure 5E:
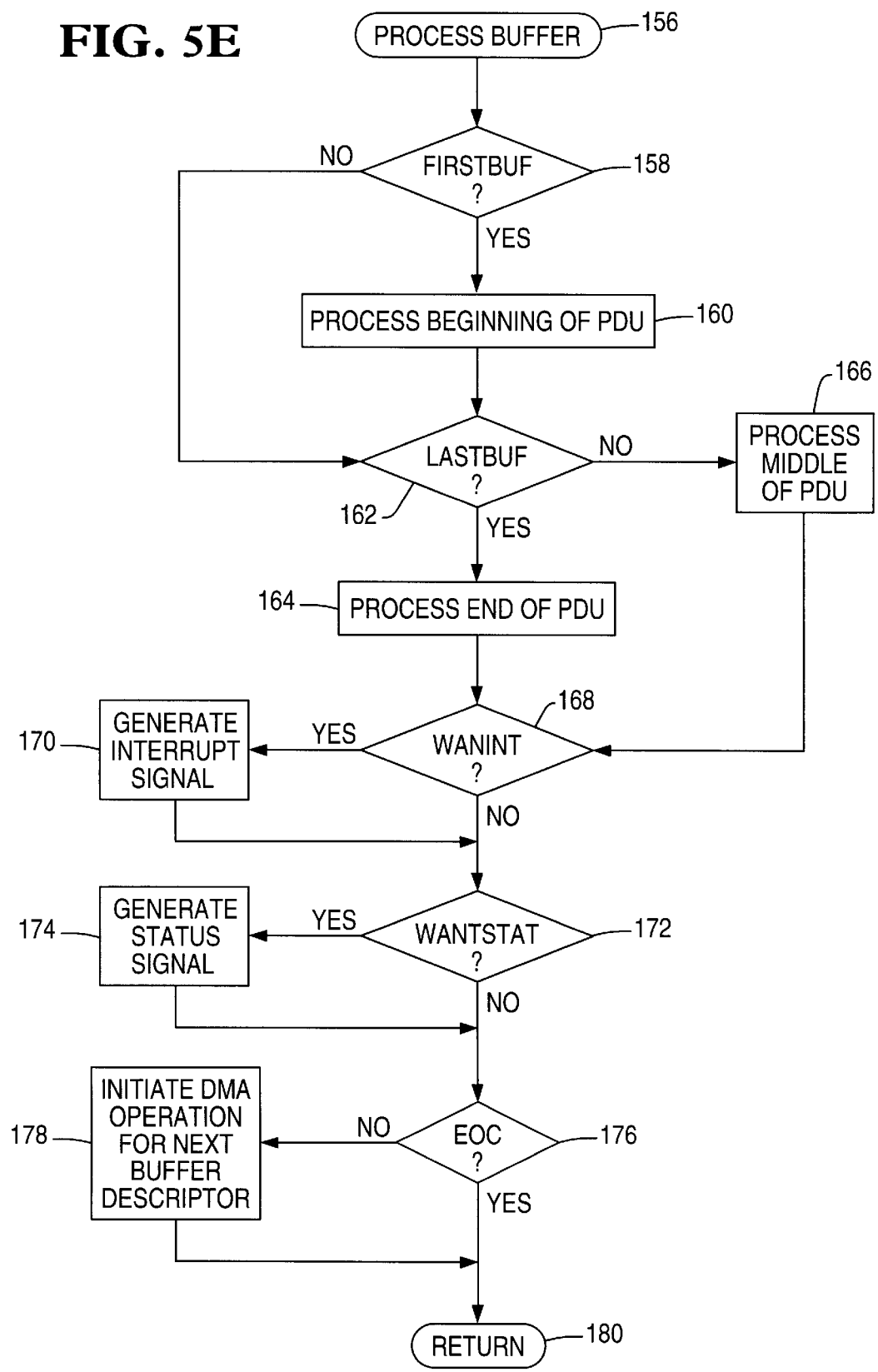

Block 134 is a decision block that represents the controller 30 determining whether the event was the receipt of the buffer 56 retrieved by a DMA operation. If so, control transfers to Block 136, which represents the controller 30 processing the buffer 56. FIG. 5E further illustrates the logic performed in Block 136.

Block 138 is a decision block that represents the controller 30 determining whether the event was the receipt of a cell from the ATM network 10. If so, control transfers to Block 140, which represents the controller 30 processing the cell by consolidating the cells into a PDU, storing the PDU in the memory 36 when it is complete, and then notifying the processor 34 of the stored PDU.

Finally, Block 142 represents the ATM segmentation controller 30 performing other processing.

FIG. 5D is a flowchart that illustrates the logic performed by the ATM segmentation controller 30 in processing the buffer descriptor 52 according to the present invention.

Block 144 represents the beginning of the logic. Block 146 is a decision block that represents controller 30 determining whether the Type bit 64 of the control field 62 of the buffer descriptor 52 indicates that the buffer descriptor 52 includes a buffer pointer 54. If so, control transfers to Block 148; otherwise, the Type bit 64 of the control field 62 of the buffer descriptor 52 indicates that the buffer descriptor 52 includes a buffer array pointer 58 and control transfers to Block 152.

Block 148 represents the controller 30 determining the length of the buffer 56 from the buffer length field 60 in the buffer descriptor 52. Block 150 represents the controller 30 initiating a DMA operation to retrieve the buffer 56 from the memory 36 using the pointer 54 in the buffer descriptor 52.

Block 152 represents the controller 30 initiating a DMA operation to retrieve the next buffer descriptor 52 from the memory 36 using the buffer array pointer 58 in the buffer descriptor 52.

Finally, Block 154 represents the return of the logic to FIG. 5C.

FIG. 5E is a flowchart that illustrates the logic performed by the ATM segmentation controller 30 in processing the buffer 56 according to the present invention.

Block 156 represents the beginning of the logic. Block 158 is a decision block that represents controller 30 determining whether the First Buffer bit 68 of the control field 62 of the buffer descriptor 52 indicates that the buffer descriptor 52 is the first one of the linked list 50 and thus is the beginning of a PDU. If so, control transfers to Block 160, which processes the beginning of PDUs; otherwise, control transfers to Block 162.

Block 162 is a decision block that represents controller 30 determining whether the Last Buffer bit 70 of the control field 62 of the buffer descriptor 52 indicates that the buffer descriptor 52 is the last one of the linked list 50 and thus is the end of a PDU. If so, control transfers to Block 164, which processes the end of PDUs; otherwise, control transfers to Block 166, which processes the middle of PDUs.

Block 168 is a decision block that represents controller 30 determining whether the Want Interrupt bit 74 of the control field 62 of the buffer descriptor 52 indicates that the buffer descriptor 52 requires an interrupt signal from the controller 30 to the processor 34 at the completion of the transmission of the PDU. If so, control transfers to Block 170, which generates an interrupt signal when the Last Buffer bit 70 is also set; otherwise, control transfers to Block 172.

Block 172 is a decision block that represents controller 30 determining whether the Want Status bit 72 of the control field 62 of the buffer descriptor 52 indicates that the buffer descriptor 52 requires a status signal from the controller 30 to the processor 34 at the completion of the transmission of the PDU. If so, control transfers to Block 174, which generates a status signal when the Last Buffer bit 70 is also set; otherwise, control transfers to Block 176.

Block 176 is a decision block that represents controller 30 determining whether the End of Chain (EOC) bit 66 of the control field 62 of the buffer descriptor 52 indicates that the buffer descriptor 52 is the last one in the linked list 50 and thus there are no more PDUs to transmit. If not, control transfers to Block 178, which initiates a DMA operation to retrieve the next buffer descriptor 52 in the linked 50 from the memory 36; otherwise, control transfers to Block 180.

Finally, Block 180 represents the return of the logic to FIG. 5C.

Conclusion

The foregoing description of the exemplary embodiments of the invention has been presented for the purpose of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data transmission apparatus, comprising an interconnected processor, memory, and data communications device, wherein the memory stores a plurality of data structures representing one or more protocol data units (PDUs), the processor creates the data structures in the memory under control of a software driver, the data communications device retrieves the data structures from the memory using direct memory access and interprets the retrieved data structures to transmit the PDUs to a remote device coupled thereto, and only a single I/O operation is performed by the software driver to initiate the direct memory access (DMA) operations by the data communications device to retrieve the data structures from the memory and subsequently transmit the PDU.

2. The data transmission apparatus of claim 1, wherein the data communications device is an Asynchronous Transfer Mode (ATM) segmentation controller.

3. The data transmission apparatus of claim 2, wherein the data communications device segments the PDUs into ATM cells for transmission to the remote device.

4. The apparatus of claim 1, wherein the data structures comprise an interface between the software driver and the data communications device.

5. The apparatus of claim 1, wherein the data structures comprise a segmentation connection table that contains one or more control data structures, and each of the control data structures specifies characteristics of a virtual connection to the remote device maintained by the data communications device.

6. The apparatus of claim 5, wherein the control data structures comprise one or more fields storing information selected from a group comprising transmission interval, service type, and a pointer to the PDU.

7. The apparatus of claim 5, wherein the data structures further comprise an array of buffer descriptors pointed to by the control data structure and the buffer descriptors describe characteristics of one or more data buffers in the PDU.

8. The apparatus of claim 7, wherein the buffer descriptors describe each data block of the PDU using information such as a length of the data block and a pointer to a location of the data block in the memory.

9. The apparatus of claim 7, wherein the array comprises one or more linked lists of buffer descriptors.

10. The apparatus of claim 7, wherein the linked lists are interconnected.

11. The apparatus of claim 7, wherein each linked list represents one or more PDUs.

12. The apparatus of claim 7, wherein the buffer descriptors comprise one or more fields storing information selected from a group comprising a pointer to a location in memory where data from the PDU is located, a pointer to a next linked list, a length field that specifies a length of the data from the PDU, and a control field that describes characteristics of the data from the PDU.

13. The apparatus of claim 12, wherein the control field comprises one or more indicators storing information selected from a group comprising:
 a buffer descriptor type indicator that indicates whether the buffer descriptor includes a buffer pointer or a buffer array pointer,
 an End of Chain (EOC) indicator that indicates whether the buffer descriptor is a last one in the linked list,
 a First Buffer indicator that indicates whether the buffer descriptor is a first one of the linked list,
 a Last Buffer indicator that indicates whether the buffer descriptor is a last one of a linked list,
 a Want Interrupt indicator that indicates whether the buffer descriptor requires transmission of an interrupt signal from the data communications device to the processor at the completion of the PDU's transmission, and
 a Want Status indicator that indicates whether the buffer descriptor requires transmission of a status signal from the data communications device to the processor at the completion of the PDU's transmission.

14. A method of data transmission between an interconnected processor, memory, and data communications device, wherein the memory stores a plurality of data structures representing one or more protocol data units (PDUs), the method comprising the steps of:
 (a) creating the data structures in the memory under control of a software driver executed by the processor;
 (b) retrieving the data structures from the memory into the data communications device using direct memory access; and
 (c) interpreting the retrieved data structures in the data communications device in order to transmit the PDUs to a remote device coupled thereto;
 (d) wherein only a single I/O operation is performed by the software driver to initiate the direct memory access (DMA) operations by the data communications device to retrieve the data structures from the memory and subsequently transmit the PDU.

15. The method of claim 14, wherein the data communications device is an Asynchronous Transfer Mode (ATM) segmentation controller.

16. The method of claim 15, wherein the data communications device segments the PDUs into ATM cells for transmission to the remote device.

17. The method of claim 14, wherein the data structures comprise an interface between the software driver and the data communications device.

18. The method of claim 14, wherein the data structures comprise a segmentation connection table that contains one or more control data structures, and each of the control data structures specifies characteristics of a virtual connection to the remote device maintained by the data communications device.

19. The method of claim 18, wherein the control data structures comprise one or more fields storing information selected from a group comprising transmission interval, service type, and a pointer to the PDU.

20. The method of claim 18, wherein the data structures further comprise an array of buffer descriptors pointed to by the control data structure and the buffer descriptors describe characteristics of one or more data buffers in the PDU.

21. The method of claim 20, wherein the buffer descriptors describe each data block of the PDU using information such as a length of the data block and a pointer to a location of the data block in the memory.

22. The method of claim 20, wherein the array comprises one or more linked lists of buffer descriptors.

23. The method of claim 20, wherein the linked lists are interconnected.

24. The method of claim 20, wherein each linked list represents one or more PDUs.

25. The method of claim 20, wherein the buffer descriptors comprise one or more fields storing information selected from a group comprising a pointer to a location in memory where data from the PDU is located, a pointer to a next linked list, a length field that specifies a length of the data from the PDU, and a control field that describes characteristics of the data from the PDU.

26. The method of claim 25, wherein the control field comprises one or more indicators storing information selected from a group comprising:
 a buffer descriptor type indicator that indicates whether the buffer descriptor includes a buffer pointer or a buffer array pointer,
 an End of Chain (EOC) indicator that indicates whether the buffer descriptor is a last one in the linked list,
 a First Buffer indicator that indicates whether the buffer descriptor is a first one of the linked list,
 a Last Buffer indicator that indicates whether the buffer descriptor is a last one of a linked list,
 a Want Interrupt indicator that indicates whether the buffer descriptor requires transmission of an interrupt signal from the data communications device to the processor at the completion of the PDU's transmission, and
 a Want Status indicator that indicates whether the buffer descriptor requires transmission of a status signal from the data communications device to the processor at the completion of the PDU's transmission.

27. An article of manufacture comprising a logic carrier readable by one or more processors and/or controllers and embodying one or more instructions executable by the processors and/or controllers to perform method steps for transmitting data between an interconnected processor, memory, and data communications device, wherein the memory stores a plurality of data structures representing one or more protocol data units (PDUs), the method comprising the steps of:
 (a) creating the data structures in the memory under control of a software driver executed by the processor;
 (b) retrieving the data structures from the memory into the data communications device using direct memory access; and (c) interpreting the retrieved data structures in the data communications device in order to transmit the PDUs to a remote device coupled thereto;

(d) wherein only a single I/O operation is performed by the software driver to initiate the direct memory access (DMA) operations by the data communications device to retrieve the data structures from the memory and subsequently transmit the PDU.

28. The method of claim 27, wherein the data communications device is an Asynchronous Transfer Mode (ATM) segmentation controller.

29. The method of claim 28, wherein the data communications device segments the PDUs into ATM cells for transmission to the remote device.

30. The method of claim 27, wherein the data structures comprise an interface between the software driver and the data communications device.

31. The method of claim 27, wherein the data structures comprise a segmentation connection table that contains one or more control data structures, and each of the control data structures specifies characteristics of a virtual connection to the remote device maintained by the data communications device.

32. The method of claim 31, wherein the control data structures comprise one or more fields storing information selected from a group comprising transmission interval, service type, and a pointer to the PDU.

33. The method of claim 31, wherein the data structures further comprise an array of buffer descriptors pointed to by the control data structure and the buffer descriptors describe characteristics of one or more data buffers in the PDU.

34. The method of claim 33, wherein the buffer descriptors describe each data block of the PDU using information such as a length of the data block and a pointer to a location of the data block in the memory.

35. The method of claim 33, wherein the array comprises one or more linked lists of buffer descriptors.

36. The method of claim 33, wherein the linked lists are interconnected.

37. The method of claim 33, wherein each linked list represents one or more PDUs.

38. The method of claim 33, wherein the buffer descriptors comprise one or more fields storing information selected from a group comprising a pointer to a location in memory where data from the PDU is located, a pointer to a next linked list, a length field that specifies a length of the data from the PDU, and a control field that describes characteristics of the data from the PDU.

39. The method of claim 38, wherein the control field comprises one or more indicators storing information selected from a group comprising:

a buffer descriptor type indicator that indicates whether the buffer descriptor includes a buffer pointer or a buffer array pointer, an End of Chain (EOC) indicator that indicates whether the buffer descriptor is a last one in the linked list, a First Buffer indicator that indicates whether the buffer descriptor is a first one of the linked list, a Last Buffer indicator that indicates whether the buffer descriptor is a last one of a linked list, a Want Interrupt indicator that indicates whether the buffer descriptor requires transmission of an interrupt signal from the data communications device to the processor at the completion of the PDU's transmission, and a Want Status indicator that indicates whether the buffer descriptor requires transmission of a status signal from the data communications device to the processor at the completion of the PDU's transmission.

* * * * *